United States Patent [19]

Droz

[11] 3,888,012
[45] June 10, 1975

[54] INSTRUMENT FOR THE SIMULTANEOUS TRANSMISSION OF THE MOVEMENTS OF A FEELER TO AT LEAST TWO READING MEANS

[75] Inventor: René Droz, Le Locle, Switzerland

[73] Assignee: Les Fabriques d'Assortiments Reunies, Le Locle, Switzerland

[22] Filed: Feb. 22, 1972

[21] Appl. No.: 228,215

[30] Foreign Application Priority Data
Mar. 1, 1971 Switzerland.................... 2976/71

[52] U.S. Cl. ................ 33/174 L; 33/23 K
[51] Int. Cl. .............................. G01b 5/25
[58] Field of Search........ 33/1 M, 23 K, 174; 308/2; 267/160; 90/62

[56] References Cited
UNITED STATES PATENTS

| 2,860,495 | 11/1958 | Stark | 64/15 B |
|---|---|---|---|
| 2,932,482 | 4/1960 | Dickie | 267/160 X |
| 3,063,670 | 11/1962 | Young | 267/160 |
| 3,122,970 | 3/1964 | Rhoades | 33/23 K |
| 3,434,086 | 3/1969 | Houpt et al. | 33/172 E |
| 3,481,577 | 12/1969 | Fling | 90/62 |
| 3,572,724 | 3/1971 | Rabinow | 274/13 |
| 3,680,401 | 8/1972 | Shaw | 33/1 M |

FOREIGN PATENTS OR APPLICATIONS
1,211,418  11/1970  United Kingdom.............. 33/174 L OTHER PUBLICATIONS
IBM Tech. Disclosure Bulletin, "Hole Sensing Device" by Gustafson Vol. 3, No. 11, 4/61.

Primary Examiner—Harry N. Haroian
Attorney, Agent, or Firm—Imirie, Smiley & Linn

[57] ABSTRACT

A measuring instrument for the simultaneous transmission of the movements of a feeler along at least two axes of coordinates to at least two reading means by the aid of two elastically deformable parallelograms combined with each other.

5 Claims, 5 Drawing Figures 3,888,012

SHEET 1

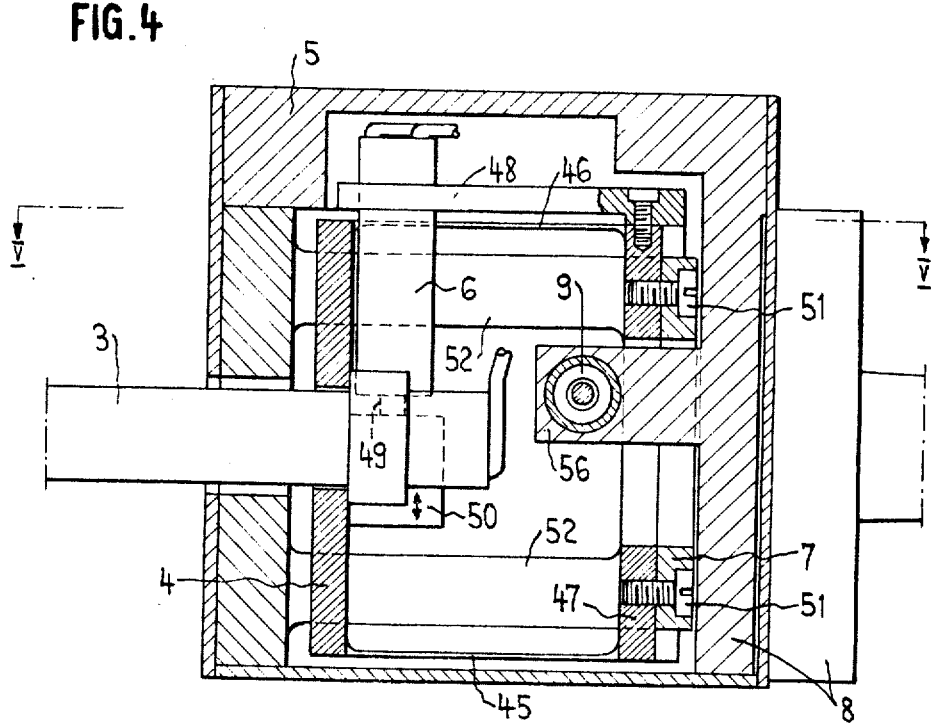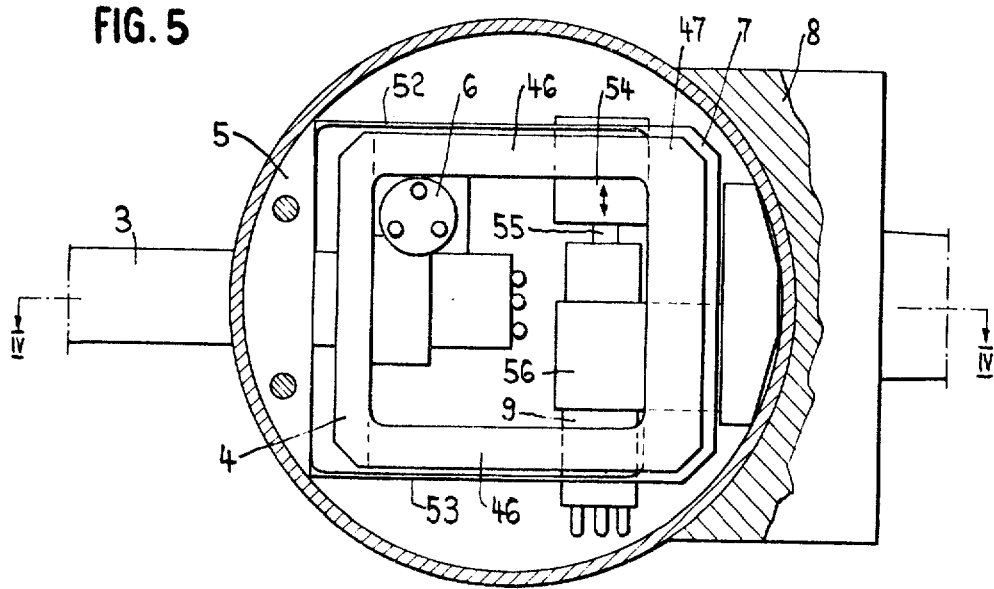

INSTRUMENT FOR THE SIMULTANEOUS TRANSMISSION OF THE MOVEMENTS OF A FEELER TO AT LEAST TWO READING MEANS

BACKGROUND OF THE INVENTION

There exist prior measuring instruments with one elastically deformable parallelogram, in which the movements of a swivelling lever are transmitted to the parallelogram. There also exist measuring instruments with a single parallelogram, but without the intercalation of a swivelling lever.

Still other systems are already known, having a sensor or probe rotatable about an axis. If these systems are, for instance, used for checking the centering of a shaft of an axle or of a bore on a machine or on a measuring apparatus, they must be turned around an axis which is in general perpendicular to the plane of movement and this fact requires decomposition of the readout of observation in accordance with the system of coordinates used.

SUMMARY OF THE INVENTION

The foregoing disadvantages are remedied by the solution according to the invention by the simultaneous transmission of the movements of a feeler. Furthermore, the instrument according to the invention, besides highest efficiency and facility in use, attains a combination of fineness, sensibility and precision greater than heretofore available.

The invention relates to an instrument for the simultaneous transmission of the movements of a feeler along at least two axes of coordinates to at least two reading or observation means, each of them having a movable portion and a sensor or probe responding to the displacements of said portion.

The instrument according to the invention is characterised by two elastically deformable parallelograms combined with each other.

A special example of performance of the invention may be characterised in that the final parallelogram, which has two elastically deformable sides parallel to each other and two other sides forming rigid bridges parallel to each other, is rigidly connected with an outer member by one of its bridges, while the second parallelogram, of the same conception as the first one, is rigidly connected to the free bridge of the first parallelogram by means of the one of the sides adjacent the elastically deformable sides, so that the second bridge, which is parallel to the first bridge, carrying the feeler, is movable along both coordinate axes.

The system according to the invention has in both coordinates a natural equilibrium point. On contact of the feeler with a workpiece to be measured the reaction of the elastically deformable parts of the two parallelograms causes a measuring pressure in the right sense, i.e., against the workpiece to be measured.

In a certain embodiment, the instrument according to the invention may also have an axial sensor or probe for measuring in a third coordinate.

The system according to the invention gives a linear transmission of the movements of the feeler independent from the length of the latter.

BRIEF DESCRIPTION OF THE DRAWINGS

FIG. 4 is a schematic vertical section of the instrument along the line TV— IV of FIG. 5, and FIG. 5 is a sectional view along the line V — V of FIG. 4.

DETAILED DESCRIPTION OF THE INVENTION

Figure 1:
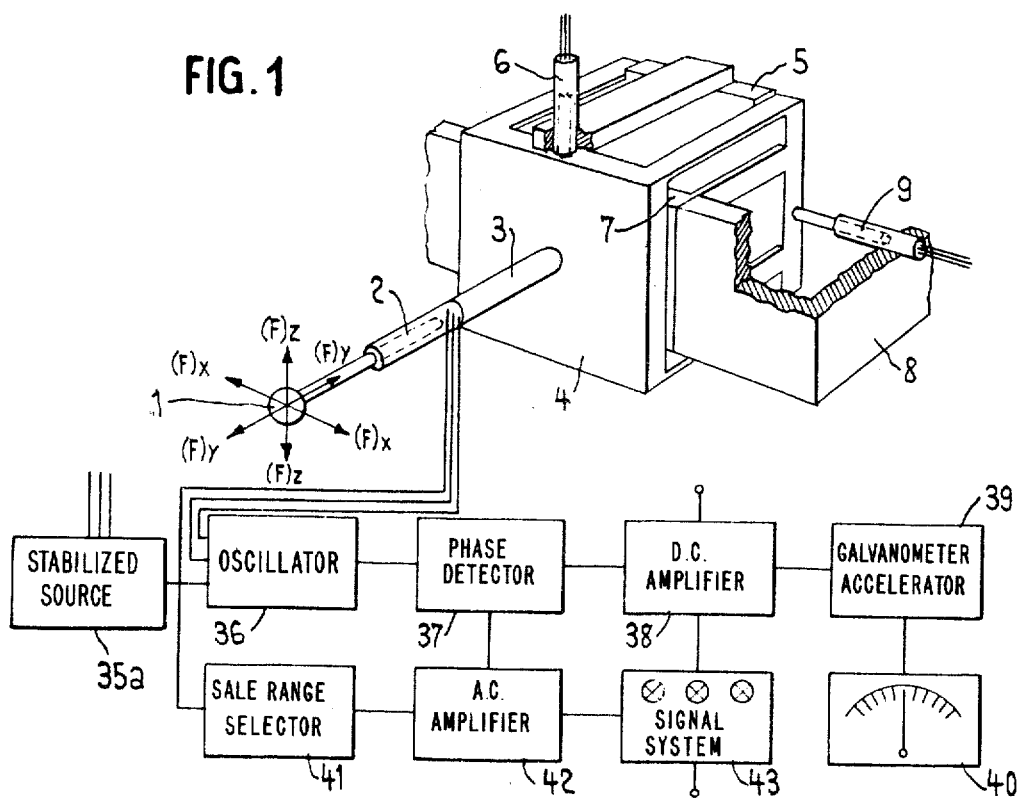
FIG. 1 is a schematic perspective view of the instrument in a three-dimensional Cartesian system of coordinates with the diagram of the different measuring stages.

As shown in FIG. 1, the feeler or probe head 1 simultaneously transmits its movements with respect to three coordinates by means of the sensor or probe 3 and the two elastically deformable parallelograms having rigid members or bridges 4 and 5. The movement in the y-axis is registered by a transducer 2. The movement in the z-axis is transmitted to the bridge 4 by means of the body of the sensor or probe 3, the change in position of the bridge 4 with regard to the bridge 5 being registered by the transductor 6.

The movement in the x-axis is transmitted by means of the body of the sensor or probe 3 to the bridges 4 and 5, the change of position of which with regard to the bridge 7, belonging to the parallelogram with the bridge 5 and being rigidly connected with the frame-shaped member 8, is registered by the transductor 9.

In the position of equilibrium, i.e., when the feeler 1 is not supported on a workpiece to be measured, the feeler 1 is stabilised in a point forming the origin of its displacements and at the same time the adjustment origin O of the reading or observation devices.

Figure 2:
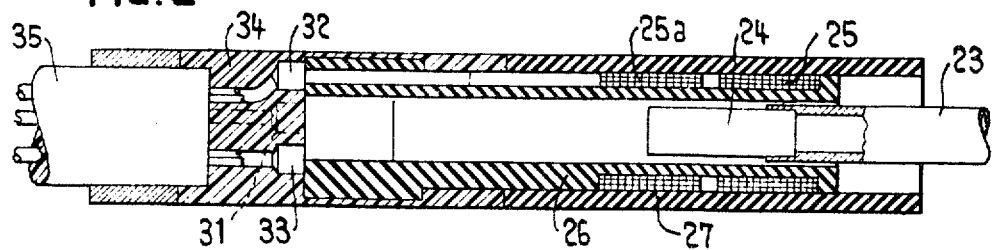
FIG. 2 is a partial longitudinal section of the electronic and connecting parts of a inductive sensor or probe.
Figure 3:
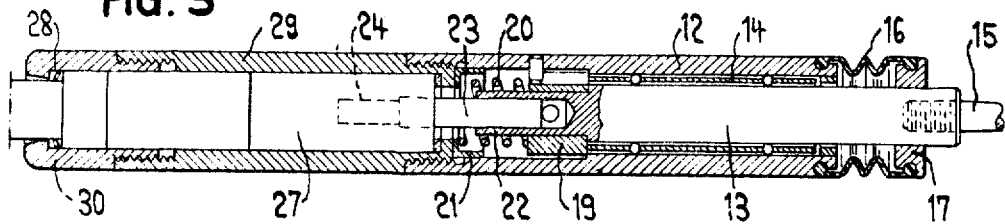
FIG. 3 is a simplified longitudinal section of a part of the feeler and the mechanical means for the inductive sensor or probe.

As illustrated in FIG. 3, the inductive sensor or probe has a main sleeve 12 constituting its body. The bore of the sleeve 12 receives the shaft 13. The one end of the shaft is made to exchangeably receive suitable feelers 1 with their stems 15. Bellows 16 fixed at the one end to the body 12 and at the other end to a ring 17 protects the inside of the sensor against dust. Over the greater portion of its length the shaft 13 is mounted on an anti-friction bearing 14. At the end turned away from the feeler head stem 15, the axle 13 forms a hollow stump 22 surrounded by a bushing 19. The bushing 19 serves the shaft 13 as a stop and prevents the shaft 13 from rotation. A return spring 20 surrounding the stump 22 abuts by its one end on a ring 21 and by its other end on the face of the bushing 19. A tube 23 of ceramics engages the bore of the stump 22, the said tube 23 receiving a ferrite-core 24 at its end turned away from its fastening region. The ferrite-core 24 concentrates the magnetic field of coils 25 and 25a (FIG. 2), these coils surrounding a sleeve 26 of ceramics and being arranged within an outer ferrite-shell 27. The full unit of FIG. 2 is adjusted in a tube 29 fixed by conventional means (FIG. 3) to the body 12 of the sensor or probe. A connection piece 30 holds the unit of FIG. 2 by means of a spring washer 28. The unit of FIG. 2 and the ferrite-core 24 form together the transducer.

In FIG. 3 the electronic device is identical in all respects with that shown diagramatically in FIG. 2. It has, embedded in insulating material 34, terminals 31, 32 and 33 feeding the coils 25 and 25a. A cable 35 may quickly be connected to the different measuring stages by means of a plug, such stages comprising a stabilized source 35a, an oscillator 36, a phase detector 37 feeding a DC-amplifier 38 and a galvanometer accelerator 39, the latter giving the indications to the galvanometer 40, further a scale range selector 41, an AC-amplifier 42 and a signal-system 43 allowing measuring on the different sensors or probes.

As briefly explained above, the inductive sensor or probe 3 (FIG. 4) is fixed to the bridge 4 of the first parallelogram. This bridge 4 is connected with an upper fixing plate or bridge 47 by means of elastically deformable blades 45 and 46, the bridge or plate 47 being formed to receive the bridge 7 of the second parallelogram.

The bridge 4 serves the purpose of transmitting a movement along the arrow (FIG. 4) to the transducer 6 which is fixed to the bridge 47 by well-known means 48 (FIG. 4) and receives in its interior a movable shaft 49 fixed by means of a tab 50 to the bridge 4. The bridge 7 of the second parallelogram, fixed by means of screws 51 to the upper plate or bridge 47 of the first parallelogram allows by means of the elastically deformable blocks 52 and 53 of the second parallelogram the transmission of the movement to the tab 54 of the probe-shaft 55 receive within the transducer 9 which is fixed to the frameshaped member 8 by means of a strut 56.

In the case of a third shaft, however, the displacement directly takes place on the level of the transductor 2 (FIG. 1).

Even under effect of a very small displacement of the feeler 1 by the contact with a workpiece to be measured, reaction forces Fx, Fy, Fz are produced and act against the surface of the workpiece.

By suitably dimensioning the elastically deformable blades of the parallelograms the characteristics of elasticity of the instrument can be modified and, in consequence, the different reaction forces Fx, Fy along the corresponding axes be adapted to the desired size of the displacements of the feeler 1. Likewise, the reaction forces Fz of the sensor or probe 3 can be adapted to the measuring requirements.

Each parallelogram may be cut out or formed in one piece from a single block of material. Even both parallelograms together may be formed or cut out from a single material block as a one-piece system.

The movements in each axis may, independently from one another, be blocked or limited at any point of their course, so that the sensor, in accordance with the choice of the measuring person, can simultaneously work in one, two or three dimensions.

The axes of the system of the coordinates may have any position with regard to one another. The instrument may also have any desired position in the space, and may form a cube-like assembly as shown.

The expression "sensor," "probe," "transductor," "feeler," "reading or observation means," are of course, in the meaning of the invention to be understood in the widest possible sense. Moreover, the use of the instrument according to the invention is not restricted to electronic measuring apparatus.

While I have described and illustrated only one emobdiment of my invention I do not wish to restrict the scope of protection thereto, but I reserve the right to make such modifications and rearrangements as may come within the purview of the following claims.

I claim:

1. An instrument for the simultaneous transmission of the movements of a feeler with respect to at least two orthogonal coordinate axes to at least two reading means, each of them having a moveable portion and a sensor responding to displacements of the said moveable portion, said instrument comprising a frame, two parallelogram assemblies combined together between said frame and the feeler, each of said parallelogram assemblies having two elastically deformable sides parallel to each other and two other sides perpendicular to said deformable sides forming rigid bridges parallel to each other and interconnecting said deformable sides, said rigid bridges being maintained parallel by said deformable sides during deformation; one of said bridges of a first one of said parallelogram assemblies being ridigly connected with said frame and the other bridge of said first parallelogram assembly being rigidly connected to one of the bridges of the second of said parallelogram assemblies with said second assembly disposed within the bounds of the four sides of said first assembly, the other bridge of said second parallelogram assembly being connected to the feeler whereby the same is moveable in at least two degrees of freedom characterized by the coordinate axes, said moveable portions of said two reading means being carried by said other bridges of said first and second parallelogram assemblies, respectively.

2. An instrument as claimed in claim 1, wherein each parallelogram assembly is formed in one piece from a single block of material.

3. An instrument as claimed in claim 1, wherein both parallelogram assemblies together form a one-piece system formed from a single block of material.

4. An instrument as claimed in claim 1, wherein the feeler is axially moveably connected to said other bridge of said second parallelogram assembly, and further including a transducer arranged to respond to axial movements of the said feeler.

5. In an instrument for registering movements of a feeler with respect to at least two orthogonal coordinate axes, a linkage assembly comprising a first parallelogram assembly including two elastically deformable parallel sides interconnected by two rigid bridges, a second parallelogram assembly including two elastically deformable parallel sides interconnected by two rigid bridges, said first and said second parallelogram assemblies disposed orthogonally with respect to each other with one bridge of each parallelogram assembly rigidly interconnected and the other bridges thereof in juxtaposition for relative movement in at least two degrees of freedom characterized by the coordinate axes, wherein each of said elastically deformable parallel sides of said first and second parallelogram assemblies includes a pair of spaced, parallel spring blades, and wherein said orthogonal disposition of said first and second parallelogram assemblies forms a cube-like assemblage.

* * * * *